(12) United States Patent
Johansson et al.

(10) Patent No.: US 7,800,360 B2
(45) Date of Patent: Sep. 21, 2010

(54) CONNECTOR SYSTEM WITH MAGNETIC AUDIO VOLUME CONTROL AND METHOD

(75) Inventors: David Johansson, Malmo (SE); Markus Gustav Agevik, Malmo (SE); Anders Lundquist, Malmo (SE); Anders Hansson, Klagerup (SE)

(73) Assignee: Sony Ericsson Mobile Communications AB, Lund (SE)

( * ) Notice: Subject to any disclaimer, the term of this patent is extended or adjusted under 35 U.S.C. 154(b) by 419 days.

(21) Appl. No.: 11/931,480

(22) Filed: Oct. 31, 2007

(65) Prior Publication Data

US 2009/0108837 A1 Apr. 30, 2009

(51) Int. Cl.
 G01B 7/30 (2006.01)
 H01R 33/96 (2006.01)
 H01R 24/04 (2006.01)

(52) U.S. Cl. .............. 324/207.25; 324/207.22; 200/51.09; 439/669

(58) Field of Classification Search .......... 439/11, 439/20, 38, 488, 489, 669; 200/50.09, 51.09, 200/51 R, 336; 324/207.25, 207.2, 207.21, 324/207.22, 207.26
See application file for complete search history.

(56) References Cited

U.S. PATENT DOCUMENTS

| | | | |
|---|---|---|---|
| 4,593,162 A * | 6/1986 | Rochette | 200/51.09 |
| 6,326,781 B1 * | 12/2001 | Kunde et al. | 324/207.21 |
| 7,445,451 B2 * | 11/2008 | Tanaka et al. | 439/15 |
| 2007/0178771 A1 | 8/2007 | Goetz et al. | |
| 2008/0247592 A1 * | 10/2008 | Kourzanov | 381/384 |

FOREIGN PATENT DOCUMENTS

| | | |
|---|---|---|
| DE | 195 21 300 A1 | 12/1996 |
| EP | 0 135 961 A | 4/1985 |
| EP | 0 338 105 A | 10/1989 |
| JP | 2004 014391 A | 1/2004 |
| WO | WO 2007/049175 A2 | 5/2007 |

OTHER PUBLICATIONS

International Search Report corresponding to PCT/IB2008/000679, mailed on Sep. 9, 2008.
Written Opinion of the International Searching Authority corresponding to PCT/IB2008/000679, mailed Sep. 9, 2008.
International Preliminary Report on Patentability for corresponding international application No. PCT/IB2008/000679 dated Dec. 10, 2009.

* cited by examiner

*Primary Examiner*—Kenneth J Whittington
(74) *Attorney, Agent, or Firm*—Renner, Otto, Boisselle & Sklar, LLP

(57) ABSTRACT

Electronic equipment control of a parameter of electronic equipment includes magnetic encoder responsive to magnetic input to provide control output for electronic equipment, a connector member connects electrically with a further connector member; the magnetic encoder receives magnetic input representing relative motion between the further connector member and the connector member to provide such control output. The further connector member has an electrical terminal connectible with the connector member, a magnet positioned relative to the electrical terminal for movement therewith providing magnetic output representing such movement, and the magnet and magnetic encoder are in proximity for magnetic coupling to provide the magnetic encoder magnetic force representing relative movement of the connector member and further connector member. A method of adjusting a parameter of electronic equipment includes effecting relative movement between connected parts of an electrical connector, and using magnetic force representation of such relative movement adjusting such parameter.

7 Claims, 3 Drawing Sheets

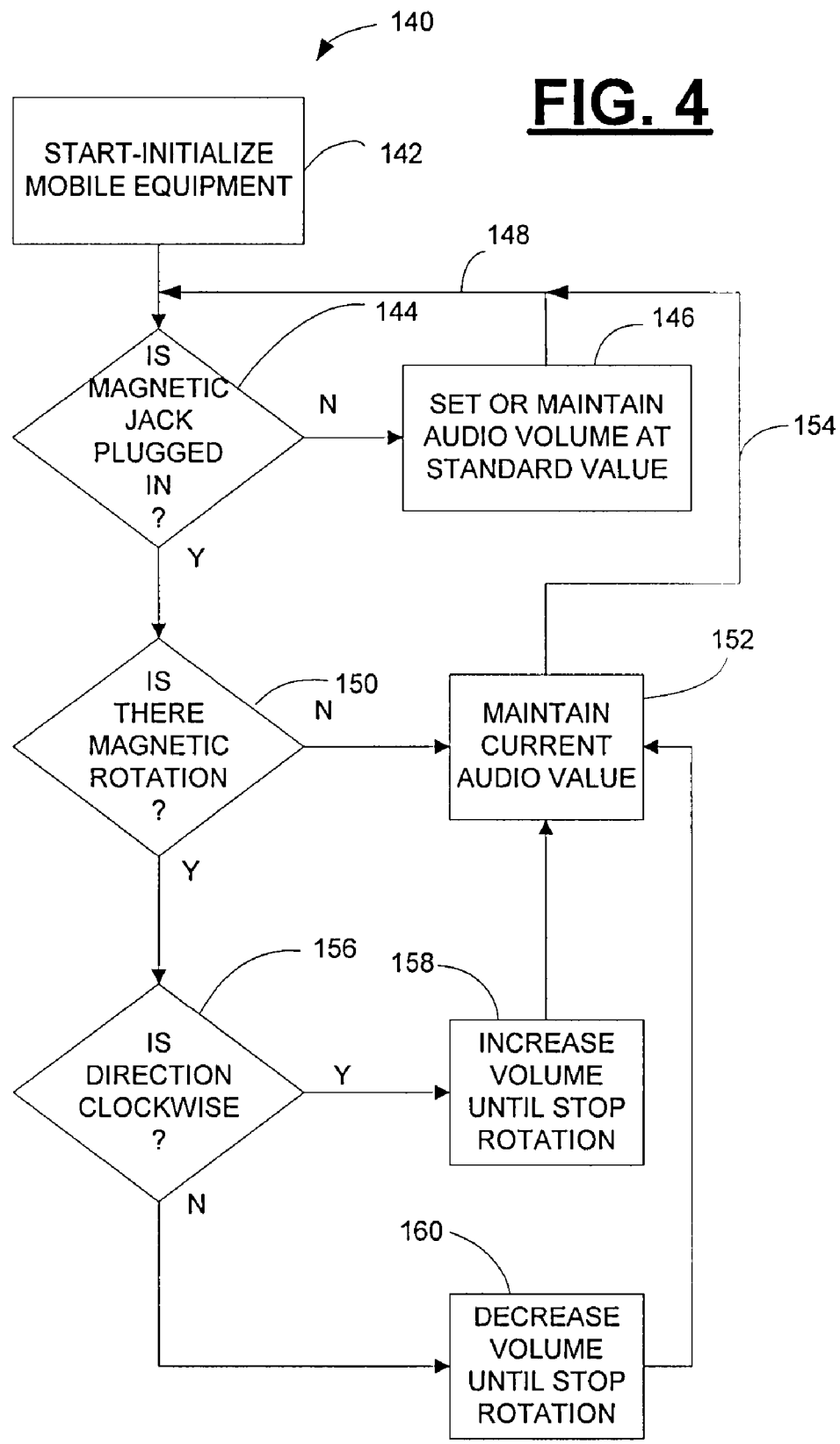

CONNECTOR SYSTEM WITH MAGNETIC AUDIO VOLUME CONTROL AND METHOD

TECHNICAL FIELD

The present invention relates generally, as indicated, to magnetic audio volume control, connector system with magnetic audio volume control, and method. The invention also relates to connector members and a connector system providing for adjusting of a parameter of an electronic device by rotating a magnet used in the connector system and to a method of adjusting a parameter of an electronic device by rotating a magnet used in a connector system for the electronic device.

BACKGROUND

Mobile and/or wireless electronic devices are becoming increasingly popular. For example, mobile telephones, portable media players and portable gaming devices are now in wide-spread use. In addition, the features and accessories associated with certain types of electronic devices have become increasingly diverse. To name a few examples, many electronic devices have cameras, text messaging capability, Internet browsing capability, electronic mail capability, video playback capability, audio playback capability, image display capability and handsfree headset interfaces. Exemplary accessories may also include headphones, music and video input players, etc.

Many mobile and/or wireless electronic devices include audio connectors and/or other connectors to which accessories, such as, for example, handsfree headsets, headphones, external speakers, and devices associated with the above and other capabilities and functions, etc., may be connected. Audio connectors and other type of connectors for such devices usually include one or more pins, contacts, terminals or terminal portions of respective wires or of printed circuit traces, and the like via which electrical signals and/or power are conducted between a connector of the mobile phone, for example, and the connector of the accessory, for example, or of another device (collectively referred to as accessories below).

One example of a parameter of a portable electronic device, such as a mobile phone, music storage and listening device, etc., is audio volume. To control or adjust volume it is intuitive to turn a knob. However, in such devices and accessories used with them, there is only a limited amount of space to put a mechanical solution for a volume control, such as a knob, push buttons, etc. Also, to use one or more keys that have several functions, one of which is volume control, may undesirably increase the complexity of use and/or construction of such electronic devices.

As electronic devices, especially portable electronic devices become smaller, there is less space available for operational controls, connectors, and the like. Also, as such electronic devices have increased features, there is less available space for adding further features. There is a need to optimize space usage on such devices.

SUMMARY

Briefly, in accordance with one aspect of the present invention, a control for electronic equipment, includes a magnetic encoder adapted to respond to magnetic input to provide a control output for electronic equipment, a connector member adapted to connect electrically with a further connector member, and wherein the magnetic encoder is in position with respect to the connector member to receive magnetic input representative of relative motion between a further connector member and the connector member to provide such control output.

According to another aspect, the magnetic encoder is responsive to rotation of a magnetic field and the relative motion is rotational motion.

According to another aspect, the connector member comprises a housing and at least one electrical terminal exposed with respect to the housing and adapted for electrical connection to a further electrical terminal of a further connector member inserted into the housing.

According to another aspect, the magnetic encoder is located generally at a distal end of the interior of the housing interior housing relative to an entrance at which a further connector member may be inserted into the housing interior, wherein the housing interior has a generally linear axis and is configured to permit rotation about such axis of a further connector while in position in the housing interior, the magnetic encoder being oriented to respond to a rotating magnetic field from a magnet associated with a further connector member when it has been inserted into the interior of the housing and is being rotated.

According to another aspect, the connector member comprises an audio connector adapted to connect by electrical conduction with a further connector member that is an audio plug or audio jack inserted into the housing and having a magnet at an end thereof to apply a rotating magnetic field upon rotation within the interior of the housing.

According to another aspect, the connector member comprises a female audio connector of an electronic device, and the control output is used to control sound volume of the electronic device.

According to another aspect, the control system further includes electric circuitry adapted to operate the electronic equipment, and wherein the control output is provided the output circuitry to effect adjustment of a parameter of the electronic equipment.

According to another aspect, the electronic equipment includes operating circuitry including an audio speaker operating capability, and wherein the control output is coupled to the operating circuitry to provide such control output to adjust speaker volume.

According to another aspect, the electronic equipment comprises a mobile phone having a speaker, and wherein the control output is provided operating circuitry of the mobile phone to adjust speaker volume.

According to another aspect, the control system comprises the further connector member, which comprises an electrical terminal adapted to make electrical connection with the connector member, a magnet in position relative to the electrical terminal and adapted for movement therewith to provide a magnetic output representative of such movement, and wherein the magnet and the magnetic encoder are in proximity for magnetic coupling thereof to provide to the magnetic encoder a magnetic force representing relative movement of the connector member and the further connector member.

According to another aspect, the connector member comprises a housing, and wherein the further connector member is at least partly insertable into the housing for the electrical terminal of the further connector member to connect electrically with another electrical terminal in the housing.

According to another aspect, the further connector member comprises a male audio jack and the connector member comprises a female audio receptacle.

According to another aspect, the connector member comprises a housing, the electrical terminal of the further connector member being insertable into the housing and adapted to make electrical connection with an electrical terminal of the connector member in the housing.

According to another aspect, the housing has an interior having a generally linear axis, and the electrical terminal of the further connector member is insertable in the housing generally along the linear axis and is rotatable about the axis to rotate the magnet to provide an input to the magnetic encoder.

According to another aspect, the further connector member includes a housing, the electrical terminal of the further connector member is generally elongate extending from the further connector member housing for insertion into the interior of the connector member housing, and the magnet is attached to the further connector member in at or adjacent the distal end of the electrical terminal of the further connector to be in proximity to the magnetic encoder when the electrical terminal of the further connector member is fully inserted in the housing of the connector member.

According to another aspect, the connector member comprises an audio connector adapted to connect by electrical conduction with the further connector member, the further connector member is an audio plug or audio jack inserted into the housing of the connector member and having the magnet at an end thereof to apply a rotating magnetic field upon rotation within the interior of the housing, further comprising operating circuitry adapted to operate the electronic equipment, and wherein the control output is provided the operating circuitry to effect adjustment of a parameter of the electronic equipment.

According to another aspect, the operating circuitry includes an audio speaker operating capability, and wherein the control output is coupled to the operating circuitry to adjust speaker volume.

According to another aspect, the electronic equipment comprises a mobile phone having a speaker, the operating circuitry is operating circuitry for the mobile phone, and wherein the control output is provided the operating circuitry of the mobile phone to adjust speaker volume in response to rotating of the further connector member relative to the connector member thereby rotating the magnet.

Another aspect relates to an electrical connector member, comprising an electrical terminal adapted to make electrical connection with another electrical terminal, and a magnet in position relative to the electrical terminal and adapted for movement therewith to provide a magnetic output representative of such movement.

According to another aspect, the electrical connector member comprises an audio plug adapted to connect with a female audio connector.

Another aspect relates to a method of adjusting a parameter of electronic equipment, comprising effecting relative movement between connected parts of an electrical connector, and using a magnetic force representation of such relative movement adjusting such parameter.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments.

Moreover, in the drawings, like reference numerals designate corresponding parts throughout the several views and may be used to designate like or similar parts in more than one embodiment. Also, primed reference numerals may be used to designate parts that are similar to parts designated by the same unprimed reference numeral.

BRIEF DESCRIPTION OF THE DRAWINGS

In the annexed drawings:

FIG. 4 is a functional block diagram illustrating an example of operation of a magnetic volume control system embodying some features of the invention.

DESCRIPTION

The interchangeable terms "electronic equipment" and "electronic device" include portable radio communication equipment. The term "portable radio communication equipment," which hereinafter may be referred to as a "mobile radio terminal," as "portable electronic equipment," or as a "portable communication device," includes all equipment such as mobile telephones, pagers, communicators, electronic organizers, personal digital assistants (PDAs), smartphones, portable communication apparatus or the like.

In the present application, embodiments of the invention are described primarily in the context of a mobile telephone. However, it will be appreciated that the invention is not intended to be limited to the context of a mobile telephone and may relate to any type of appropriate electronic equipment, examples of which include a media player, a gaming device, PDA and a computer, etc.

Figure 1:
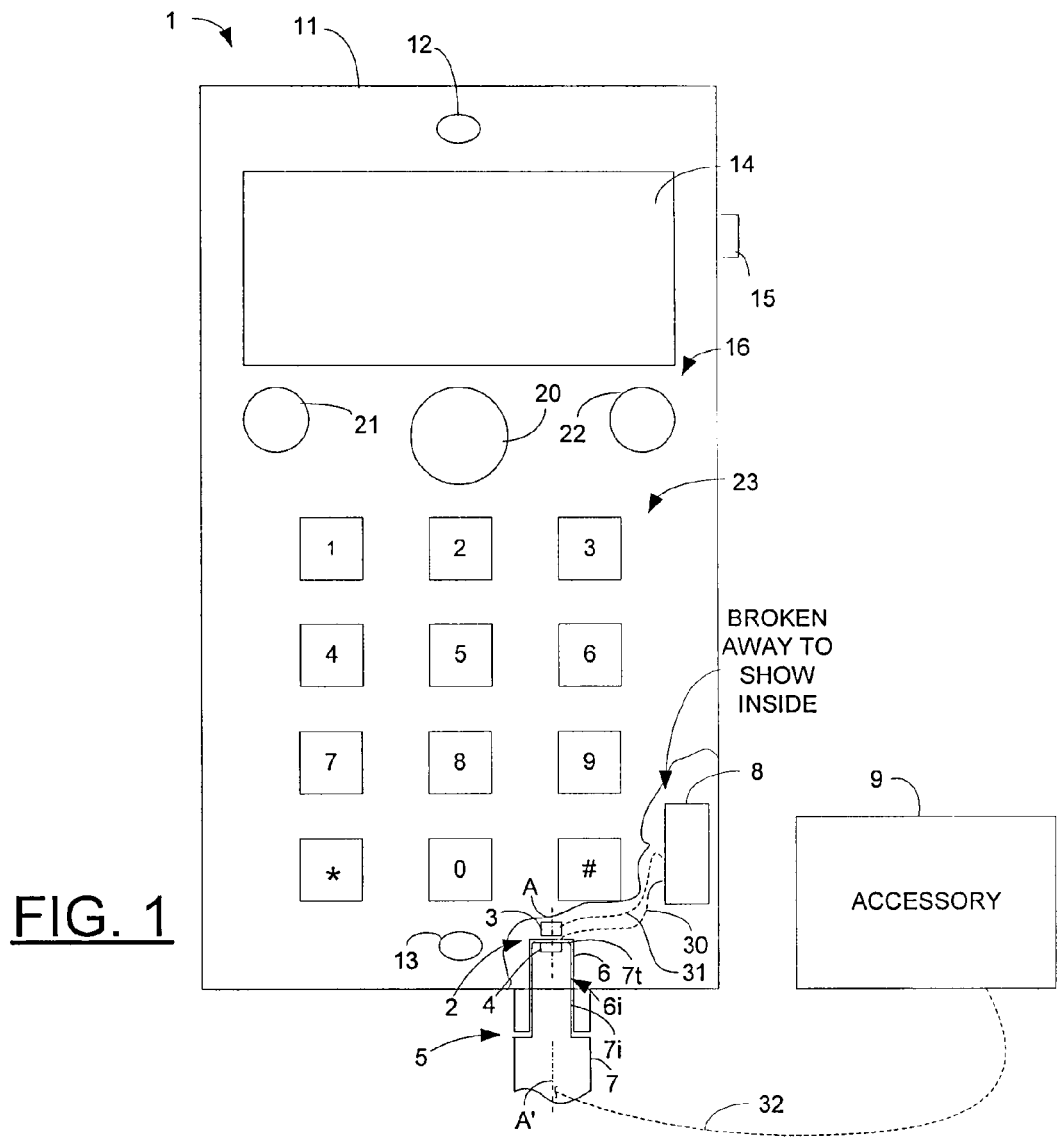
FIG. 1 is a schematic illustration of the front of a portable communication device, e.g., in the form of a mobile phone, having a magnetic volume control and connector system according to an embodiment of the present invention.

Referring to FIG. 1, the invention is described with reference to an electronic device 1, such as, for example, a portable electronic device, e.g., a mobile phone, music, radio, or video playing device, etc., and a magnetic volume control 2. In the interest of brevity the electronic device will be described below with reference to a mobile phone.

In the illustrated embodiment the magnetic volume control 2 includes a magnetic encoder 3 and a magnet 4. Relative motion between the magnet and magnetic encoder may be sensed, detected or "felt" (collectively referred to as "sensed" below) by the magnetic encoder, which in turn provides an output that may be used by the mobile phone 1 to adjust or to control a parameter of the mobile phone, such as, for example audio volume.

A connector system 5, such as, for example, an audio connector system, includes a female receptacle 6 (sometimes referred to as an audio receptacle, audio plug housing, audio socket or opening, or the like) and a male plug 7 (sometimes referred to as an audio plug or audio jack). One example of a connector system 7 that is used in mobile phones and other portable electronic devices is an audio connector referred to as a 3.5 millimeter connector. The invention may be used with this or other types of connector systems. The audio connector system 5 may be the same as or similar to a conventional audio connector system except that the magnetic encoder 3 and magnet 4 of the magnetic volume control 2 are associated with the audio connector system. For example, the magnet 4 may be mounted to the male plug 7 at the distal tip 7*t* thereof so that when the male plug has been fully inserted into the hollow interior 6*i* of the female receptacle 6, the magnet is substantially fully within the female receptacle. The magnetic encoder 3 may be positioned or mounted in the female receptacle 6 such that it is within or outside of the hollow interior 6*i* but in any event is sufficiently near the fully inserted magnet 4 to sense the magnetic field from the magnet.

As is conventional for audio connector systems, the hollow interior 6*i* of the female receptacle is of generally elongate linear shape, e.g., extending along a generally linear axis A, and the electrical terminal portion 7*i* of the male plug also is generally of an elongate linear shape, e.g., extending along a generally linear axis A', and is of a length and size (form factor) to fit in the hollow interior 6*i* and to engage corresponding terminals of the female receptacle 6 within the hollow interior. For example, the cross section of the hollow interior 6*i* and cross section of the male plug electrical terminal portion 7*i* may be generally circular so that the hollow interior and the male plug electrical terminal portion are generally of circular cylindrical shape. The hollow interior 6*i* and the male plug electrical terminal portion 7*i* may be of a different shape than just described. However, the hollow interior 6*i* and the male plug electrical terminal portion 7*i* should be related to permit rotating of the male plug electrical terminal portion while it is within the hollow interior and connecting with electrical terminals of the female receptacle 6.

With the male plug electrical terminal portion 7*i* inserted in the hollow interior 6*i* such that the axes A and A' are substantially congruent and the magnet 4 is near the magnetic encoder 3, as was described above, the male plug 7 may be rotated about the axes A, A' within the hollow interior. Such rotating rotates the magnet 4, and the magnetic field provided by the rotating magnet also rotates. The magnetic encoder 3 senses the magnetic field, including the direction of rotation, e.g., relatively clockwise or counterclockwise, the speed of rotation, and the amount of rotation, e.g., the polar angle or distance over which the magnetic field rotates, for example, from the start of the current rotation, and the magnetic encoder in turn provides an output signal representative of such sensed direction, speed and distance. Such output signal may be used by operating circuitry 8 of the mobile phone 1 to adjust or to control a parameter of the mobile phone, for example, the audio volume of the mobile phone speaker(s). The output signal may be used to adjust one or more other parameters instead of or in addition to the audio volume of the mobile phone speaker, such as, for example, other parameter(s) of the mobile phone and/or parameter(s) of one or more accessories 9 attached to the mobile phone by the connector system 5.

In using the mobile phone 1 with the magnetic volume control, a person may insert the audio plug 7 into the audio receptacle 6 placing the magnet 4 near the magnetic encoder and also completing electrical connections between the mobile phone and the accessory or other device attached to the mobile phone via the connector system 5. Then, the user may rotate the audio plug 7 about the axes A, A' and thereby adjust or control the audio volume provided for sounds from the mobile phone speaker(s) and/or from the accessory(ies).

The portable communication device 1 will be referred to below as a mobile phone. However, as was mentioned above, reference to "mobile phone" includes various other electronic equipment or devices, such as, for example, those mentioned above. In outward appearance, for example, as is illustrated in FIG. 1, the mobile phone is of one type of design or style; however, the features of the invention, as are described in further detail below, may be used in other types of mobile phones, such as those that include cases that open and close (sometimes referred to as a "flip phone," "slidable case phone," etc.), and various other mobile phones that currently exist or may come into existence in the future.

In the exemplary embodiment of the invention described herein, the connector system 5 may connect the mobile phone 1 to an earphone speaker, to headphones, to external stereo speakers, to other types of accessories or devices, etc. (collectively referred to as accessories for brevity) that may be used with the mobile phone. Electrical signals may be coupled by the connector system 5 between the mobile phone 1 and one or more accessories; power connection also may be provided between the mobile phone and accessories. Adjustment of audio volume and/or of one or more other parameters may be provided by rotating the audio plug 7.

It will be appreciated that the audio connector system 5 is backwards compatible, for example, in the following sense. If an audio plug 7 that does not include a magnet 4 associated therewith were plugged into the female receptacle 6, rotating of the audio plug would not cause the magnetic encoder to produce an output representing relative motion of the audio plug and female receptacle because there would not be a magnet to affect the magnetic encoder. In such case the operating circuitry 8 of the mobile phone 1 may provide a standard audio output of mid-range volume that is not able to be adjusted. Alternatively a separate audio adjustment may be provided instead of the rotating audio plug and magnet.

The electrical connector system 5 connects the mobile phone 1, e.g., the operating circuitry 8 thereof, with another device, e.g. an accessory 9, a remote device, etc. Such electrical connector system 5 may be in the general form of an audio connector including both a female receptacle 6 and a male audio plug 7 that is intended to plug into the female receptacle. Features of the invention, including the magnetic volume control (or other parameter control) may be carried out using other types of connector systems. Since many portable electronic devices already have an audio connector system, using that audio connector system to adjust or to control audio volume by rotating the male audio plug in its receptacle provides for such volume adjustment to be carried out without taking up additional space on the mobile phone for an audio volume adjusting mechanism.

As is seen in FIG. 1, the mobile phone 1 includes case (housing) 11, speaker 12, microphone 13, display 14, e.g., liquid crystal display, light emitting diode display, or other display, on/off switch 15, and a number of keys generally indicated at 16. The keys 16 may include a number of keys having different respective functions. For example, the key 20 may be a navigation key, selection key or some other type of key; the keys 21, 22 may be, for example, one or more soft switches or soft keys (two examples are shown); and the keys 23 may be dialing keys. As an example, the navigation key 20 may be used to scroll through lists shown on the display 14, to select one or more items shown in a list on the display to move a cursor shown on the display, etc. The soft switches 21, 22 may be manually operated to carry out respective functions for which the key is designated by prior setting of the mobile phone, for example, or functions such as those shown or listed on the display 14 in proximity to the respective soft switch or selected by the navigation key 20, etc. The dialing keys 23 may be used to dial a telephone number or to input alphanumeric or other data and the dialed number may be called by pressing a send key or one of the soft switches 21, 22. The speaker 12, microphone 13, display 14, and keys 16 may be used and function in the usual ways in which a mobile phone typically is used, e.g. to initiate, to receive and/or to answer telephone calls, to send and to receive text messages, to connect with and to carry out various functions via a network, such as the Internet or some other network, to beam information between mobile phones, etc. These are examples; there may be other uses that currently exist or may exist in the future. The mobile phone 1 also includes operating circuitry 24 that responds to programming and to inputs, e.g., provided by a user pressing a key or applying a stylus or finger to a touch-sensitive screen, etc., or provided from an external source, such as an incoming telephone call or text message, to carry out functions of the mobile phone. As is seen in FIG. 1, part of the housing of the mobile phone is broken away to show an interior portion of the housing, including the operating circuitry 8 and the electrical connector system 5.

Figure 2:
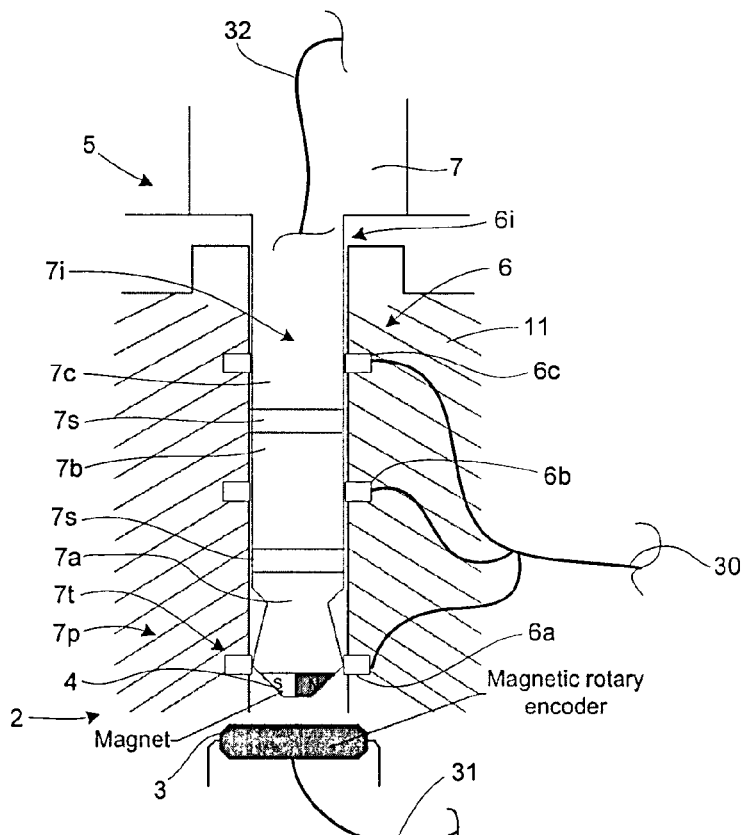
FIG. 2 is an enlarged fragmentary view of the magnetic volume control in a connector system of FIG. 1.

As is seen in FIG. 2, the female receptacle 6 has one or more (in the illustrated embodiment three) electrically conductive terminal members (also referred to as electrically conductive terminals or parts) 6a, 6b, 6c, and the male audio plug 7 has one or more (usually a corresponding number, in the illustrated embodiment three) electrically conductive terminal members 7a, 7b, 7c. The respective electrically conductive terminal members 6a-6c, 7a-7c may be, for example, contacts, pins, wires, terminals, electrically conductive traces on a printed circuit board, etc. (any of which is used synonymously herein). The terminal members 6a-6c are positionally arranged in the female receptacle 6 to be in or exposed to the hollow interior 6i of the female receptacle 6 and the terminal members 7a-7c of the male plug 7 are positionally arranged such that with the male plug inserted into the hollow interior 6i of the female receptacle 6, respective terminals are in paired alignment and electrical connection relation. For example, the terminals 6a-6c would be electrically connected to respective terminals 7a-7c.

The terminal members 6a-6c may be conventional terminal members typically used in an audio female receptacle of an audio connector system. Such terminal members 6a-6c may fully circumscribe the axis A in the hollow interior 6i or may only extend part way about the axis A, or they may be otherwise configured. The terminal members 7a-7c also may be conventional as are used in conventional audio plugs. Electrical insulation 7s may be used to separate respective adjacent terminal members 7a-7c, as is illustrated, for example.

It is noted, as mentioned above, that the form factor of the female receptacle 6, particularly the hollow interior 6i thereof, may be like a standard receptacle for an audio jack, for example. Therefore, if a standard audio plug (audio jack) 7 were plugged into the receptacle 6, electrically conductive connections between respective terminals of the receptacle and the audio plug may be achieved. Thus, such receptacle is backwards compatible and may be used with other standard audio jacks that do not have the magnetic volume adjusting capability described herein. Also, it will be appreciated that although examples herein may be directed to audio connection and audio jacks or connectors, etc., the invention may be used with other types of connections and connectors.

Electrically conductive path 30, e.g., wires, conductive traces on printed circuit boards, etc., from respective electrical terminal members 6a-6c are provided to the operating circuitry 8 of the mobile phone 1, and a similar electrical connector path 31 is provided from the magnetic encoder 3 to the operating circuitry 8. Electrically conductive path 32, e.g., wires, conductive traces on printed circuit boards, etc., some of which may be within the inside or core of the male plug 7, are provided to the accessory, remote device, etc. 9.

As is illustrated in FIG. 2, the magnet 4 is a bar magnet that has north and south poles spaced apart generally in a direction across the axes A, A', e.g., perpendicular to the line of such axes. The magnet 4 may be glued or otherwise attached to the distal end or tip 7t of the electrical terminal portion 7p of the male plug 7. As the male plug 7 is rotated manually by a person, the magnet 4 rotates to change the relative locations of the north and south poles of the magnet, thereby causing or creating a rotating magnetic field.

The magnetic encoder 3, for example, a magnetic rotary encoder, may be a conventional device that provides an electrical output signal representing the rotational direction, speed and distance of rotation. Such encoders are known in the art. Such output signal from the magnetic encoder may be provided to the operating circuitry 8 and used thereby to adjust audio volume of the speaker 12 and/or of another speaker(s) associated with the accessory 9.

The magnetic encoder 3 may provide a null output signal or some other predetermined output signal if no magnet is near it. For example, if no male plug 7 is in the female receptacle 6 or if the plug does not have a magnet. Such null output signal may be provided the operating circuitry 8 causing it to set the given adjustable parameter, e.g., audio volume, to a standard level. Also, if desired, a male plug that is a "dummy" in that it does not make connections with the terminal members 6a-6c, may be used to provide a magnet near the magnetic encoder. Such male plug may be similar to the male plug 7 described above, but it does not have terminal members as described. Such "dummy" male plug may have a magnet at the tip and be used simply to change the audio volume by rotating it in the hollow interior 6i of the female receptacle 6, as is described above.

Figure 3:
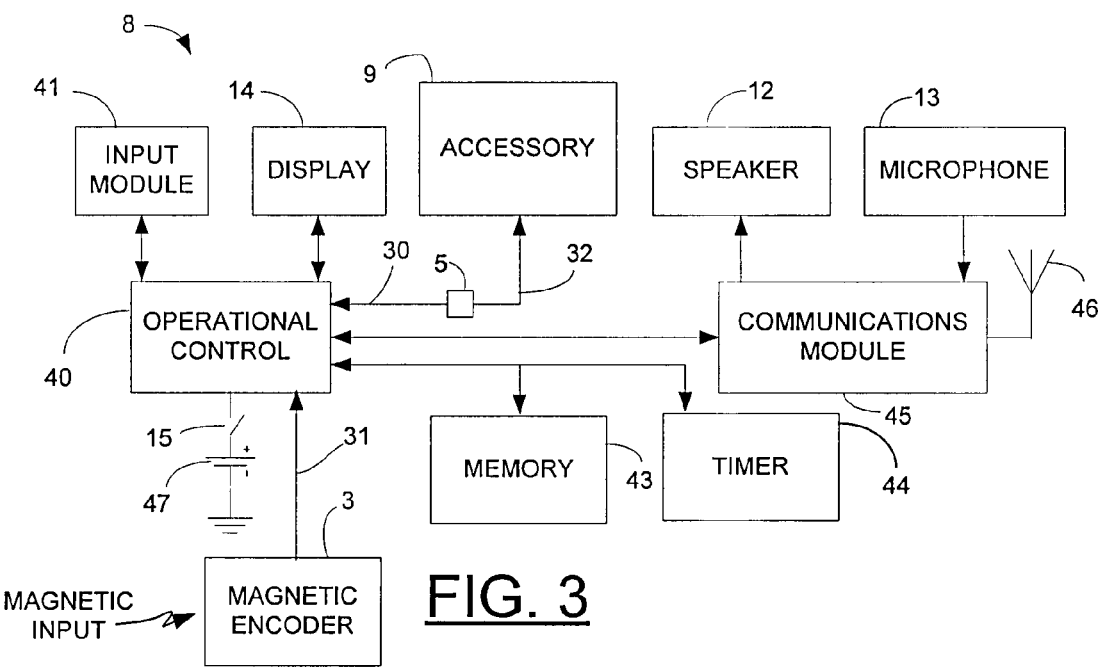
FIG. 3 is a schematic block system diagram of operating circuitry of the mobile phone of FIG. 1.

Turning to FIG. 3, a schematic block system diagram of operating circuitry 8 of the mobile phone 1 is illustrated. The illustration is exemplary; other types of circuitry may be employed in addition to or instead of the operating circuitry 8 to carry out the various functions of a mobile phone and the various functions described in detail herein. The operating circuitry includes an operational control 40 that controls the various components of the operating circuitry 8. An input module 41 provides inputs to the operational control 40, such as, for example, inputs from the various keys 16. Inputs also may be provided from the display 14 if it is a touch screen type of display, and inputs also may be provided the input module 41 from other connections to the mobile phone, etc. The display 14 may be a touch screen that provides for inputs to the input module 41 by touching using a finger, a stylus, or some other device, and the result of such touching may be provided as inputs to the operational control 40. The operational control 40 also may operate the display 14 to determine what information, icons, images, etc. is shown on the display 14.

The magnetic rotary encoder 3 also is coupled by connection 31 to provide its output signal as an input to the operational control 40. In response to such input the operational control 40 may adjust or control audio output or some other parameter of the speaker 12 or of another device, e.g., accessory 9, etc., as was described above.

The accessory 9 is coupled to the operating circuitry 8 via the connector system 5. More particularly, the accessory 9 is connected to the operational control 40 of the operating circuitry and operates in response to the operational control 40 and/or in response to receiving other suitable input. The accessory 9 also may provide input to the operating circuitry 8 via the connector system 5.

Electrical power may be provided by the operational control 40 to the accessory 9. Program code in the operating circuitry 8, e.g., stored in the memory 43, may control operation of the operational control 40 to operate the accessory 9. Circuitry in and/or programming in the operating circuitry 8 and/or operational control 40 may determine various operational features of the mobile phone 1 and/or the accessory 9.

As an example, the operational control 40 may be a microprocessor or some other electrical or electronic device that is responsive to various inputs, e.g., input signals, and provides various outputs, e.g., output signals. The operational control 40 may be internally programmed or manufactured in a way to include internal programming thereof to carry out various functions. However, in many instances an operational control 40 of a mobile phone 1 would have associated therewith the memory 43 in which appropriate programming instructions, computer program, logic, etc., may be provided the operational control 40 to carry out the functions thereof. The memory may include identity information concerning respective accessories and settings of the operating circuitry in response to respective identity information. The memory 43 also may include storage for telephone numbers and other information concerning contacts who may be called, messaged, etc. using the mobile phone 1, storage of photographs and/or other data, as often is the capability of such memory in conventional mobile phones, for example, and the memory may be used for other purposes that may come into existence in the future. The memory 43 may be a read only memory, random access memory (RAM), flash RAM, programmable read only memory, or some other memory device. Also associated with the operational control 40 is a timer 44 that can be used to provide timing signals representing increments of time for synchronizing operation of the operating circuitry 8 with some other device, for clock/calendar control functions, and/or for determining amount of time (duration) for a screensaver function.

The operating circuitry 8 also includes a communications module 45 that receives inputs from microphone 13 and provides outputs to the speaker 12, as are common functions in a mobile phone. An antenna 46 may be coupled to the communications module 45 to transmit and to receive signals representing telephone communications, data communications, messages, etc. The communications module 45 may operate under control of the operational control 40 in the usual manner of a mobile phone. Additionally, the communications module 45 may provide an input to the operational control 40 to indicate that there is an incoming telephone call or text message; and in response thereto, the operational control 40 may operate the display 14 in conventional manner, e.g., to indicate an incoming phone call, to show a text message or photograph, etc.

A power supply 47 provides electrical power to the operating circuitry 8 and/or to other parts of the mobile phone 1 via the on/off switch 15. The power supply may be a conventional battery or some other source of electrical power. Upon closing the on/off switch 15, the power is provided the operating circuitry 8 to carry out the various functions described herein, for example. If desired, closing the switch 15 may lead to temporary operation of the display to display a start-up message or indication, and then a power saving feature, e.g., a screensaver function, may be implemented to turn off the display.

Operation of the mobile phone 1 may be under computer program control or the like. Such operation may be as is performed to carry out the functions of a mobile phone. Operation of the accessory 9 may be carried out under computer program control or the like. Such operation also may be as is performed in a conventional manner. The computer programs and computer program control may be carried out by persons who have ordinary skill in the art to prepare and to use such programs and control. New computer program control techniques and methods also may be developed in the future by persons having ordinary skill in the art and may be used in connection with the connector system and mobile phone and accessories.

Briefly referring to FIG. 4, an exemplary block diagram, also referred to as a logic diagram, routine or flow chart, is illustrated at 140. The logic diagram includes a number of steps that represent an example of operation of the mobile phone 1 having a magnetic volume control 2, as is describe herein. Other operational examples also are possible. The several steps that are illustrated and described in FIG. 4 may be carried out using computer program software or the like that may be provided the mobile phone 1 and/or the accessory 9. Such software may be written in an appropriate computer language or code by a person who has ordinary skill in the art based on the disclosure herein. The functions illustrated in the logic diagram 140 that are described below may be carried out by the operating circuitry 8. The program code may be stored in the memory 43.

In the logic diagram 140, at block 142 is start and/or initialization. This may represent a turning on of the mobile phone 1, for example. At block 144 an inquiry is made whether a connector, audio jack, audio plug 7, etc. with a magnet 4 is plugged in to the mobile phone 1, e.g., at the female housing 6. If the answer is no, then at block 146 the audio volume of speaker 13, for example, is set to a standard level or is maintained at a standard level, and loop 148 is followed back to block 144. If the answer is yes, then at block 150 an inquiry is made whether magnetic rotation is sensed by the magnetic encoder, e.g., are the audio plug 7 and magnet 4 rotating? If the answer is no, then at block 152 the current audio value is maintained and loop 154, 148 is followed back to block 144. If the answer is yes, then at block 156 an inquiry is made whether the rotational direction of the rotating audio plug 7 and magnet 4 is clockwise (or the inquiry could be for counterclockwise, if desired). If the answer is yes, then at block 158 audio volume is increased until rotation has stopped. Thereafter, at bloc, 152 the current audio value is maintained and loop 154, 148 is followed to block 144. If at block 156 the direction of rotation is not clockwise, e.g., it is counterclockwise, then at block 160 the audio volume is decreased until rotation has stopped. Thereafter, at block 152 the current audio value is maintained and loop 154, 148 is followed.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

We claim:

1. A control for electronic equipment, comprising a magnetic encoder adapted to respond to magnetic input to provide a control output for electronic equipment, a connector member adapted to connect electrically with a further connector member, and wherein the magnetic encoder is in position with respect to the connector member to receive magnetic input representative of relative motion between the further connector member and the connector member to provide such control output, wherein said connector member comprises a housing and said at least one electrical terminal is exposed with respect to the housing and is adapted for electrical connection to a further electrical terminal of the further connector member inserted into the housing, wherein the magnetic encoder is located generally at a distal end of the interior of the housing relative to an entrance at which the further connector member may be inserted into the housing interior, wherein the housing interior has a generally linear axis and is configured to permit rotation about such axis of the further connector while in position in the housing interior, the magnetic encoder being oriented to respond to a rotating magnetic field from a magnet associated with the further connector member when it has been inserted into the interior of the housing and is being rotated, and wherein the connector member comprises an audio connector adapted to connect by electrical conduction with the further connector member that is an audio plug or audio jack inserted into the housing and having a magnet at an end thereof to apply a rotating magnetic field upon rotation within the interior of the housing.

2. The control of claim 1, wherein the connector member comprises a female audio connector of an electronic device, and wherein the control output is used to control sound volume of the electronic device.

3. A control for electronic equipment, comprising
a magnetic encoder adapted to respond to magnetic input to provide a control output for electronic equipment,
a connector member adapted to connect electrically with a further connector member, and
wherein the magnetic encoder is in position with respect to the connector member to receive magnetic input representative of relative motion between the further connector member and the connector member to provide such control output,
wherein said further connector member comprises
an electrical terminal adapted to make electrical connection with the connector member,
a magnet in position relative to the electrical terminal and adapted for movement therewith to provide a magnetic output representative of such movement,
wherein the magnet and the magnetic encoder are in proximity for magnetic coupling thereof to provide to the magnetic encoder a magnetic force representing relative movement of the connector member and the further connector member,
wherein the connector member comprises a housing, the electrical terminal of the further connector member being insertable into the housing and adapted to make electrical connection with an electrical terminal of the connector member in the housing,
wherein the housing has an interior having a generally linear axis, and the electrical terminal of the further connector member is insertable in the housing generally along the linear axis and is rotatable about the axis to rotate the magnet to provide an input to the magnetic encoder, and
wherein the further connector member includes a housing, the electrical terminal of the further connector member is generally elongate extending from the further connector member housing for insertion into the interior of the connector member housing, and the magnet is attached to the further connector member in, at or adjacent the distal end of the electrical terminal of the further connector member to be in proximity to the magnetic encoder when the electrical terminal of the further connector member is fully inserted in the housing of the connector member.

4. A control for electronic equipment, comprising
a magnetic encoder adapted to respond to magnetic input to provide a control output for electronic equipment,
a connector member adapted to connect electrically with a further connector member, and
wherein the magnetic encoder is in position with respect to the connector member to receive magnetic input representative of relative motion between the further connector member and the connector member to provide such control output,
wherein said further connector member comprises
an electrical terminal adapted to make electrical connection with the connector member,
a magnet in position relative to the electrical terminal and adapted for movement therewith to provide a magnetic output representative of such movement,
wherein the magnet and the magnetic encoder are in proximity for magnetic coupling thereof to provide to the magnetic encoder a magnetic force representing relative movement of the connector member and the further connector member, and
wherein the connector member comprises an audio connector adapted to connect by electrical conduction with the further connector member, the further connector member is an audio plug or audio jack inserted into the housing of the connector member and having the magnet at an end thereof to apply a rotating magnetic field upon rotation within the interior of the housing, further comprising operating circuitry adapted to operate the electronic equipment, and wherein the control output is provided the operating circuitry to effect adjustment of a parameter of the electronic equipment.

5. The control of claim 4, wherein the operating circuitry includes an audio speaker operating capability, and wherein the control output is coupled to the operating circuitry to adjust speaker volume.

6. The control of claim 4, wherein the electronic equipment comprises a mobile phone having a speaker, the operating circuitry is operating circuitry for the mobile phone, and wherein the control output is provided the operating circuitry of the mobile phone to adjust speaker volume in response to rotating of the further connector member relative to the connector member thereby rotating the magnet.

7. The electrical connector member of claim 4, comprising an audio plug adapted to connect with a female audio connector.

* * * * *